Figure 1:
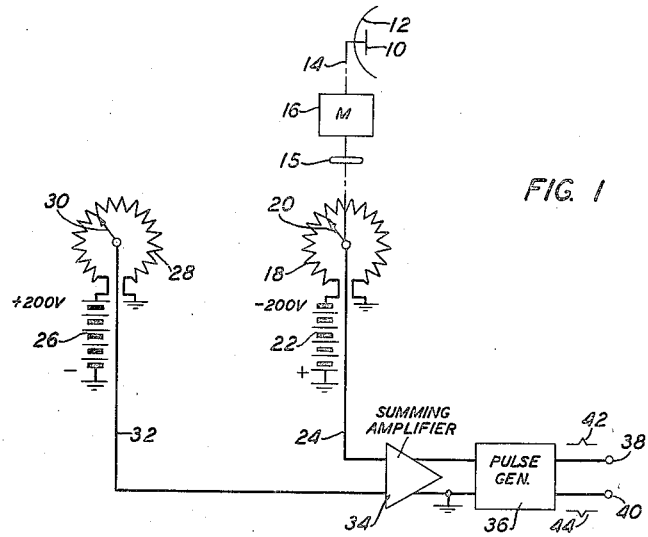

May 24, 1949.   W. L. GAINES   2,471,268
INDEX PULSE GENERATING CIRCUIT
Filed May 22, 1945

INVENTOR
W. L. GAINES
BY
H. O. Wright
ATTORNEY

Patented May 24, 1949

2,471,268

UNITED STATES PATENT OFFICE 2,471,268

INDEX PULSE GENERATING CIRCUIT

Wilbur L. Gaines, Great Neck, N. Y., assignor to Bell Telephone Laboratories, Incorporated, New York, N. Y., a corporation of New York Application May 22, 1945, Serial No. 595,210

4 Claims. (Cl. 250—27)

This invention relates to control circuits. More particularly it relates to electrical circuits adapted to produce unidirectional electrical index pulses at the instant a device varying in either direction over a prescribed range of positions passes through a predetermined position in said range, the position at which pulses are produced being determined by adjustment of an electrical control device, the adjustable range of which suffices to select any position through which the varying device passes as that at which the index pulses are produced.

A principal object of the invention is, accordingly, to provide an electrical circuit which produces unidirectional electrical index pulses whenever a varying device passes through a predetermined position.

Other and further object of the invention will become apparent during the course of the following description of an illustrative embodiment and from the appended claims.

A frequent problem encountered in connection with object detecting and ranging systems, particularly with those employing radio energy which is directed in a sharp beam from an antenna, the antenna being rotated in azimuth to scan an area, is that of providing a mark on the indicator of the radar system at the instant the antenna beam is directed in a particular preselected direction. The problem is more complex where, as is frequently the case, the antenna is not rotate continuously but is oscillated back and forth through an arc to cover only a sector or portion of the area which would be covered by complete rotation of the antenna.

A convenient means of providing an electrical voltage the value of which at each instant represents the angle at which the antenna is directed is a circular potentiometer, across the winding of which a source of direct current voltage has been connected, the contact arm of which is turned in synchronism with the turning motion of the antenna. If the antenna is oscillated back and forth through an arc or sector, as is frequently desirable, the voltage alternately rises and falls between two limiting values representing the range of angles within the selected arc or sector. If then it is desired to produce an "azimuth marker pulse" each time the antenna passes through a particular angular direction within the selected arc or sector, it is necessary to devise a type of electrical circuit which will produce a pulse as the voltage passes in either direction through the value corresponding to that particular angular direction or azimuth.

In arrangements of the invention this is accomplished by providing a second manually adjustable potentiometer across which a second source of direct current potential of opposite polarity is connected so that a voltage equal to the value corresponding to any particular desired direction within the range of interest can be established by manual adjustment. (The second potentiometer can obviously be provided with a scale calibrated to read directly the angular direction corresponding to each setting.) The voltage thus established and the varying voltage from the potentiometer associated with the antenna are introduced into a conventional "summing amplifier," i. e. an amplifier whose output represents the sum of two or more input voltages. If one input voltage is made to vary in a negative sense with respect to ground and the other in a positive sense, then each time the varying voltage passes through the value corresponding to the setting of the manually adjusted potentiometer the sum of the two voltages and the output of the summing amplifier will pass through zero at the preselected point. It remains then only to provide an electrical circuit which will produce index pulses of the desired character each time the output of the summing amplifier passes through zero. This latter requirement is complicated by the fact that the variable voltage can be either increasing or decreasing as it passes through the critical value and the invention therefore comprises a circuit which will provide the desired index pulses for either direction of variation.

Figure 2:
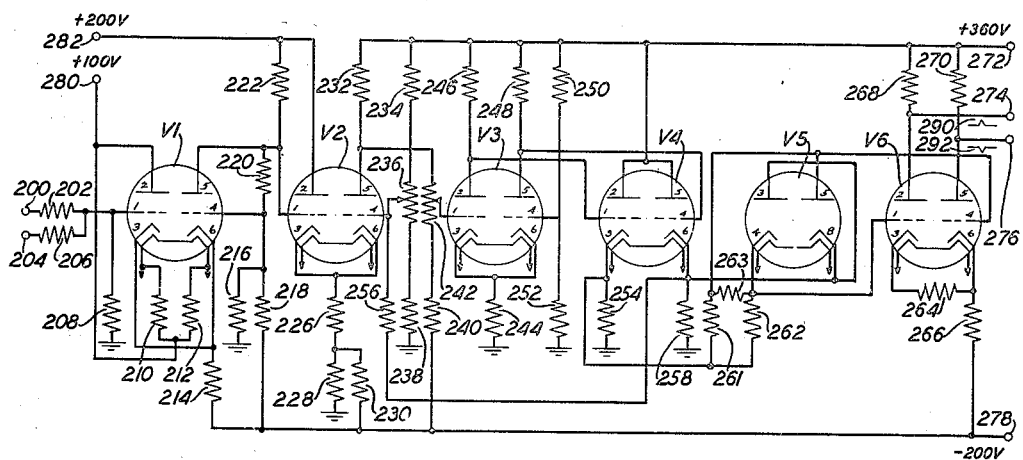

The principles of the invention will become more readily apparent from the following description of an illustrative circuit of the invention and from the accompanying drawings in which:

Fig. 1 shows in schematic diagram form the general arrangement and illustrates a use of an illustrative embodiment of the invention; and Fig. 2 shows in electrical schematic diagram form the particular circuits employed in an illustrative embodiment of the invention.

In more detail in Fig. 1 element 10 represents a dipole, or the like, antenna positioned at the focus of a paraboloidal reflecting member 12, the combination being supported on a vertical shaft 14 arranged to be rotated continuously or oscillated back and forth through an arc by a motor mechanism 16. Alternatively motor mechanism 16 can be deenergized and the shaft can be rotated or oscillated by handwheel 15.

The lower end of shaft 14 turns a contacting member 20 which traverses the winding 18 of a circular potentiometer, one end of which winding is grounded and the other end of which connects to the negative terminal of a direct current potential source 22 supplying a suitable voltage such as 200 volts. The positive terminal of source 22 is grounded as shown.

There is also provided a second circular potentiometer, which can conveniently be substantially identical with the above-mentioned potentiometer, having winding 28 and contacting member 30, the latter member being manually adjustable to any desired position on the winding 28. One end of winding 28 is grounded and the other end connects to the positive terminal of a second suitable direct current potential source 26, having a voltage of 200 volts. The negative terminal of source 26 is grounded.

The contacting arms 20 and 30 of the two above-mentioned potentiometers are connected to input terminals of summing amplifier 34, a conventional form of which is shown in detail in Fig. 2, (vacuum tubes $V_1$ and $V_2$ and associated circuits) to be described in detail hereinunder.

The output of the summing amplifier 34, which is, of course, equal at any instant to the sum of the voltages applied to the input terminals thereof, is connected to the pulse generator 36, a suitable form of which is also shown in detail in Fig. 2, vacuum tubes $V_3$ to $V_6$, inclusive, and associated circuits to be described in detail presently.

Pulse generator 36 responds to the output of amplifier 34 by providing at terminals 38 and 40 a positive pulse and a negative pulse, respectively, whenever the output of amplifier 34 passes through zero weather its voltage is passing from negative to positive values with respect to zero (or ground) or vice versa.

Since one input voltage from source 22 is negative with respect to ground and the other from source 26 is positive with respect to ground, the input to amplifier 34 will pass through zero as contacting member 20 passes the point on winding 18 corresponding to the point on winding 28 at which contacting member 30 is set. Also, where the voltage derived from source 22 through winding 18 is greater than that derived from source 26 through winding 28 the sum of the inputs to amplifier 34 will be negative with respect to ground and for the reverse condition the sum of the inputs will be positive so that in passing through zero the sign of the output voltage of amplifier 34 will change. The direction of the change, i. e. whether from positive to negative or vice versa, obviously depends upon the direction in which shaft 14 is being turned.

In Fig. 2, as pointed out above, vacuum tubes $V_1$ and $V_2$ and the circuits directly associated therewith, comprise a conventional form of summing amplifier which comprises two stages, the first including vacuum tube $V_1$ which is in reality the summing amplifier stage and the second including vacuum tube $V_2$ which is essentially an amplifier stage. The output of this amplifier, from anode 5 of tube $V_2$, varies in the same way as the algebraic sum of the two input voltages, passing through zero when the sum is zero.

The input terminals 200 and 204 are connected to two series resistors 202 and 206 which, together with the common shunt resistor 208, determine the portions of the two input voltages (from potentiometer contact arms 20 and 30 of Fig. 1) which are applied to the control element or grid 1 of vacuum tube $V_1$. As is well known to those skilled in the art, the input series resistors 202 and 206 can be given different values when a "conditioned summation" of the two input voltages is desired, i. e. if it were desired to vary the manually controlled voltage over a greater or lesser range than the voltage controlled by the scanning member, its effect upon the input of the summing amplifier could be brought back to a parity relation with the latter voltage by properly proportioning resistors 202 and 206 with respect to each other. As this is not important in the illustrative embodiment selected, it is assumed for the sake of simplicity that the range of variation is the same for both voltages in which case resistors 202 and 206 can be of the same value. The matter is mentioned only for the purpose of pointing out that numerous equivalent arrangements can be introduced into systems of the invention at many points thereof without departure from the spirit and scope of the invention.

Tube $V_1$ as shown in Fig. 2, can conveniently be a double triode in a single envelope, or it can equally well be two separate triode vacuum tubes. The cathode elements 3 and 6 of tube $V_1$ are connected together as shown and by means of the common cathode resistor 214 are connected to the —200 volt terminal of a suitable source of direct current potential the positive terminal of which is grounded.

One of the plates or anodes, designated 2, of tube $V_1$ is connected to terminal 280 which in turn is connected for normal operation to the positive terminal of a suitable source of 100 volts direct current, the negative terminal of the source being grounded. The heater elements for the cathodes 3 and 6 of $V_1$ are also connected through resistors 210 and 212 to terminal 280 as shown for the purpose of reducing the introduction of power frequency noise into the amplifier. The other anode 5 of tube $V_1$ connects through resistor 222 to terminal 282 to which is connected for normal operation to the positive terminal of a suitable source of 200 volts direct current, the negative terminal of the source being grounded. Resistors 216 and 218 provide at their junction point a suitable bias potential for grid 4 of tube $V_1$, the other ends of resistors 216 and 218 being connected, respectively, to ground and to —200 volts direct current normally on terminal 278. Resistor 220 connecting the anode 5 and grid 4 of tube $V_1$ provides a stabilizing feedback voltage.

The first half of tube $V_1$ comprising anode 2, control grid 1 and cathode 3 is virtually a "cathode follower" stage since the second half comprising anode 5, control grid 4 and cathode 6 is coupled thereto only through the common cathode resistor 214. The latter resistor also, of course, serves to feed back energy from the second half to the first and thus stabilizes the action of the amplifier particularly against variation in the voltages of the supply sources mentioned above.

It can be readily seen that a multistage direct coupled amplifier of this type would require a rather high voltage power supply if some precautions were not taken. Such precautions have been taken in this circuit and the operating point of each tube is kept within reasonable limits by means of the negative supply and potential dividers. Resistors 236 and 242 represent such dividers. The negative supply also permits the operation of such a circuit as shown in $V_1$ with its grids substantially at ground potential. This circuit needs a large common cathode resistance for effective operation and to provide the necessary voltage for the current flow in this resistance, a negative supply is required.

The output from anode 5 of tube $V_1$ connects directly to the control grid 1 of tube $V_2$. Tube $V_2$, like tube $V_1$, can conveniently be a double triode within a single envelope, the first half thereof comprising anode 2, control grid 1 and cathode 3 and the second half comprising anode 5, control grid 4 and cathode 6; or, alternatively, two separate triode tubes can be employed.

Like tube $V_1$ the two halves of tube $V_2$ are coupled through a common cathode resistor path comprising resistors 226 and 228 but an additional bias in this path is provided through resistor 230 which connects between the junction point of resistors 226 and 228 and terminal 278, to which, as hereinbefore described, is connected the negative terminal of a suitable source of 200 volts direct current.

Anode 2 of tube $V_2$ connects directly to terminal 282 (normally at +200 volts direct current) and anode 5 of tube $V_2$ connects through resistor 232 to terminal 272 which is normally connected to the positive terminal of a suitable source of 360 volts direct current, the negative terminal of the source being grounded.

The control grid 4 obtains a bias from the combination of potentiometer 236 and fixed resistors 234 and 238, which three resistive elements are connected in series as shown between terminal 272 (+360 volts) and ground. Adjustment of this bias is afforded by potentiometer 236, as shown.

A feedback voltage is also supplied to grid 4 of tube $V_2$ through tubes $V_3$ and $V_4$ and the circuit including resistor 256 for the purpose of stabilizing the gain and operating point of the amplifier.

The stage including tube $V_2$ is employed primarily for the purpose of amplification of the voltage provide at anode 5 of tube $V_1$.

The next stage including tube $V_3$ is a substantially conventional cathode-coupled phase-inverter stage. Tube $V_3$ is, as shown, a double triode, control grid 1 of which connects to the output anode 5 of tube $V_2$ through the circuit including potentiometer 242 and resistor 240 in series, the upper end of potentiometer 242 connecting to anode 5 of tube $V_2$ and the lower end of resistor 240 connecting to terminal 278 (−200 volts direct current).

Cathodes 3 and 6 of tube $V_3$ are connected together as shown and through the common cathode resistor 244 to ground.

Anodes 2 and 5 of tube $V_3$ connect through equal isolating resistors 246 and 248, respectively, to terminal 272 (+360 volts direct current).

The control grid 4 of tube $V_3$ is provided with a substantially constant bias voltage by being connected to the junction of resistors 250 and 252. These resistors are connected in series, the upper terminal of resistor 250 being connected to terminal 272 (+360 volts direct current) and the lower terminal of resistor 252 being grounded.

The phase-inverter stage including tube $V_3$ is adjusted by means of potentiometer 242 so that with no input voltage from anode 5 of tube $V_2$ applied to control grid 1, the anode-cathode currents between anode 2 and cathode 3 and anode 5 and cathode 6 of tube $V_3$ will be equal. The potentials at anodes 2 and 5 of tube $V_3$ are then equal, that is, there is zero potential difference between them. If then a voltage increasing in a positive direction is applied to control grid 1 of tube $V_3$, the current through the anode 2, cathode 3, path of tube $V_3$ will increase and consequently the potential of anode 2 will decrease. Also, the voltage drop across cathode resistor 244 will increase, rendering control grid 4 of tube $V_3$ effectively more negative, decreasing the current through the anode 5, cathode 6 path of tube $V_3$, and the potential of anode 5 of tube $V_3$ will consequently increase. Obviously if the input voltage is then brought back to zero, the potentials of anodes 2 and 5 of tube $V_3$ will return to their original equal potentials. If the input voltage is next increased in a negative direction, the potential of anode 2 of tube $V_3$ will increase, decreasing the bias across cathode resistor 244, rendering control grid 4 of tube $V_3$ more positive, increasing the current in the cathode 6, anode 5 path of tube $V_3$ and causing the potential of anode 5 to decrease. Again if the input voltage (negative) is brought back to zero, the potentials at anodes 2 and 5 of tube $V_3$ will return to their condition of equality.

The next stage, including vacuum tube $V_4$ is a simple push-pull cathode-follower stage. Its control grids 1 and 4 are connected as shown to anodes 2 and 5 of tube $V_3$, respectively. Anodes 2 and 5 of tube $V_4$ are connected to terminal 272 (+360 volts direct current) as shown. Cathodes 3 and 6 of tube $V_4$ connect through individual cathode resistors 254 and 258, respectively, to ground. As mentioned above, a feedback voltage is provided from cathode 6 of tube $V_4$ to control grid 4 of tube $V_2$ through resistor 256.

As is well known to those skilled in the art, a cathode follower stage of the type including tube $V_4$ functions to reproduce across its respective cathode resistors the voltage wave forms developed at the outputs of the immediately preceding stage but at a lower impedance level.

The remainder of the circuit of Fig. 2, including double diode vacuum tube $V_5$ and double triode vacuum tube $V_6$, will be considered as a unit.

The voltage developed across cathode resistor 254, above-mentioned, is connected through resistor 261 to anode 5 of tube $V_5$ and control grid 4 of tube $V_6$. Resistor 261 is shunted by resistors 262 and 263 connected in series, the junction point of the last two resistors being connected to cathode 4 of tube $V_5$, and control grid 1 of tube $V_6$, as shown.

The voltage developed across cathode resistor 258, in addition to being fed back through resistor 256 to control grid 4 of tube $V_2$ as described above, is also directly impressed upon cathode 8 and anode 3 of tube $V_5$.

With no input voltage to the control grid 1 of tube $V_3$, i. e. for the zero voltage input condition, to the summing amplifier (tubes $V_1$ and $V_2$), the voltages developed across the cathode resistors 254 and 258 associated with tube $V_4$ will be equal, i. e. their difference will be zero. The biases applied to tube $V_6$ are such that in passing through the condition of zero difference between the voltages across resistors 254 and 258 in either direction, i. e. from positive to negative, or vice versa, voltage pulses will be generated at anodes 2 and 5 of tube $V_6$, graphically represented by pulses 290 and 292 in Fig. 2, respectively, pulse 290 at anode 2 being positive and pulse 292 at anode 5 being negative.

This is brought about in the following manner. Assume that cathode 3 of tube $V_4$ is positive with respect to cathode 6 of tube $V_4$ and that the voltages of these two cathodes are approaching their common "zero input" value. The positive voltage at cathode 3 finds a path through resistor 262 to make control grid 1 of tube V₆ positive and decreasing in potential. The half of tube V₅ comprising anode 3 and cathode 4 is poled in the wrong direction and no current passes through it. The negative diminishing voltage at cathode 6 of tube V₄, however, finds a path through anode 5, cathode 8 of tube V₅ to control grid 4 of tube V₆. In this case resistor 261 acts as a shunt across cathodes 3 and 6 of tube V₄.

Elements 4, 5 and 6 of tube V₆ are normally biased to cut-off but as control grid 4 thereof becomes less negative, a point is reached at which the voltage at this grid is close enough to zero for current to flow. Tube V₆ then opens up very rapidly, forming a negative pulse at anode 5 thereof and a positive pulse at anode 2 as mentioned above.

If the opposite direction for the voltage across cathodes 3 and 6 of tube V₄ is assumed, the result is the same, that is, with the voltage at cathode 3 negative and diminishing, grid 4 of tube V₆ becomes less negative through the circuit including resistor 261 and the critical point is again reached at which the desired voltage pulses are formed precisely as for the case of opposite polarity above described. In this case the shunting circuit comprises resistor 262 and elements 3 and 4 of tube V₅.

The action of the circuit just described can be briefly summarized as follows. Considering the voltage at grid 1 of tube V₁ to be zero, then if the circuits are correctly adjusted and set up, the voltages from cathodes 3 and 6 of tube V₄ to ground are equal. No current is being passed by either of the diodes of V₅ and thus grids 1 and 4 of V₆ are at equal potential with respect to ground. Because of resistor 264, the first half of the tube V₆ is in a semi-cut-off condition. Now, any change of the voltage applied to grid 1 of tube V₁ will cause the voltages at cathodes 3 and 6 to be unequal, and by virtue of this circuit no matter what the polarity of this change, grid 1 of V₆ will become more positive and grid 4 of V₆ will become more negative. Resistor 263 is in the circuit to reduce the effective gain, thus widening the base of the pulse.

Thus, at coincidence (zero voltage grid 1 of V₁), plate 2 of V₆ assumes its most positive position. At any point removed from coincidence, it is more negative. The amount it can go negative is determined only by the resistors and circuits of this tube. This will, however, reach a finite limit. The amount of movement of grid 1 of tube V₁ required for plate 2 of V₆ to reach its finite limit is determined solely by the amplifier characteristics of the total network V₁ to V₆, that is by the amount of gain.

Terminals 274 and 276 are, of course, the output terminals to which connections are made from circuits to be controlled by the pulses generated. Circuits requiring a positive control pulse are, of course, connected to terminal 274 and those requiring a negative control pulse are obviously connected to terminal 276. A primary purpose of the over-all circuit employed for illustrative purposes is to provide a circuit which will generate control pulses each time that the highly directive beam of the exploring or scanning antenna passes through a particular azimuth angle whether the antenna is rotated in one direction continuously or oscillated back and forth through an arc including the particular azimuth angle. Pulses thus obtained can be employed to provide azimuth marks on the indicator associated with radar system (usually one or more cathode-ray oscilloscopes are employed with each radar system) or they can be employed to operate a circuit to light a signal lamp or similar warning device.

Obviously, the principles of the invention can also be employed in many other systems to provide indications or warning signals whenever a movable element passes any particular selected point in its normally traversed path or orbit. Numerous other arrangements can therefore manifestly be readily devised by those skilled in the art to operate in accordance with the principles of the invention without departing from its spirit and scope. The scope of the invention is defined in the following claims.

What is claimed is:

1. An index control pulse generating system for generating control pulses of predetermined character each time that a rotating or oscillating member passes through any particular selected point within the path or orbit of its motion, which comprises in combination, a first variable voltage dividing device, a first direct current voltage source, one terminal of said device and the positive terminal of said source being grounded, the other terminal of said device being connected to the ungrounded terminal of said source, a mechanical coupling between said device and the rotating or oscillating member to vary the output voltage of said device continuously as said member moves, a second variable voltage dividing device, a second direct current voltage source, one terminal of said device and the negative terminal of said second voltage source being grounded, the other terminal of said device being connected to the ungrounded terminal of said source, manual means for adjusting the voltage output from said second voltage varying device, to any value within the range of variation of the first stated voltage varying device, a summing amplifier, electrical connections between the outputs of said first and second voltage varying devices and the input of said summing amplifier, a phase-inverter vacuum tube circuit providing a push-pull output, the input of said circuit being connected to the output of said summing amplifier, a push-pull cathode follower vacuum tube circuit, the input of said last-mentioned circuit being connected to the output of said phase-inverter circuit, a pulse generating vacuum tube circuit comprising at least a double triode vacuum tube circuit, or its equivalent, biased to produce a negative pulse at one anode and a positive pulse at the other anode when the input voltage thereto passes through zero and at least a double diode rectifying vacuum tube circuit, or its equivalent, said rectifying circuit being cooperatively connected between the output of said push-pull cathode follower circuit and the input of said pulse generating circuit whereby said last-mentioned circuit provides a negative index pulse at one anode and a positive index pulse at the other anode whenever the output of said summing amplifier passes through zero.

2. An index generating circuit for use in a system which performs a recurrent and reversible sweeping action and in which it is desired to obtain an index pulse at a predetermined adjustable point in the sweeping action for both directions thereof, the combination which comprises a first means providing a first voltage which increases uniformly throughout the sweeping action when in one direction and decreases uniformly throughout the same sweeping action when performed in the reverse direction, said first voltage having a particular discrete value for each point in the sweeping action irrespective of the direction of sweep, a second means providing a second voltage adjustable to equal the value of said first voltage but of opposite polarity at any selected point in the sweeping action and a third means cooperatively associated with said first and said second means and responsive to said first and said second voltages to provide electrical impulses of predetermined and invariable polarity whenever said first voltage passes through the value to which said second voltage is instantly adjusted, said third means comprising in combination a summing amplifier the input of said amplifier being connected to said first and said second means, a phase inverter vacuum tube circuit providing a push-pull output, the input of said phase inverter circuit being connected to the output of said summing amplifier, a push-pull cathode follower vacuum tube circuit, the input of said last-mentioned circuit being connected to the output of said phase inverter circuit, a pulse generating vacuum tube circuit comprising at least a double triode vacuum tube circuit biased to produce a negative pulse at one anode and a positive pulse at the other anode when the input voltage thereto passes through zero and at least a double diode rectifying vacuum tube circuit, said rectifying circuit being cooperatively connected between the output of said push-pull cathode follower circuit and the input of said pulse generating circuit.

3. In an electrical system, a first voltage source providing a first voltage of predetermined polarity which varies between particular limiting values, a second voltage source providing a second voltage of the opposite polarity to said first voltage the value of which is adjustable to any discrete value within the said limiting values and means including a summing amplifier cooperatively associated with and responsive to said first and said second voltage sources to provide an electrical impulse of a predetermined and invariable polarity at instants during which said first voltage passes in either direction through the value to which said second voltage is adjusted said last-stated means also including in tandem relation with said summing amplifier a phase inverter vacuum tube circuit, a cathode follower circuit, a rectifying circuit and a pulse generating circuit.

4. An index pulse generating circuit for use in a system which performs a recurrent and reversible sweeping action and in which it is desired to obtain an index pulse at a predetermined adjustable point in the sweeping action for both directions thereof, the combination which comprises a first means providing a first voltage which increases uniformly throughout the sweeping action when in one direction and decreases uniformly throughout the same sweeping action when performed in the reverse direction, said first voltage having a particular discrete value for each point in the sweep irrespective of the direction of sweep, a second means providing a second voltage adjustable over a range of voltages of opposite polarity to the range of voltages swept by said first means, said second range of voltages having a definite known relation to said first range of voltages, a summing amplifier, the input of said amplifier electrically connecting to said first and said second voltage providing means, the input circuits of said amplifier being proportioned and arranged to weight the voltage from said second means in accordance with said definite known relation between said voltage ranges, a phase inverter circuit, a push-pull cathode follower circuit, a rectifying circuit and a pulse generating circuit, said summing amplifier, phase inverter, cathode follower, rectifying and pulse generating circuits being connected electrically in tandem and providing a pulse of predetermined character whenever said first and said second means provide predetermined voltages proportioned in accordance with said definite known relation.

WILBUR L. GAINES.

REFERENCES CITED

The following references are of record in the file of this patent:

UNITED STATES PATENTS

| Number | Name | Date |
|---|---|---|
| 2,266,401 | Reeves | Dec. 16, 1941 |
| 2,321,605 | Keinath | June 15, 1943 |